(12) United States Patent
Kumon et al.

(10) Patent No.: US 8,216,670 B2
(45) Date of Patent: *Jul. 10, 2012

(54) HEAT RAY SHIELDING GLASS FOR VEHICLE AND PROCESS FOR PRODUCING THE SAME

(75) Inventors: Soichi Kumon, Matsusaka (JP); Shigeo Hamaguchi, Matsusaka (JP); Masanori Saito, Matsusaka (JP); Yoshinori Akamatsu, Matsusaka (JP)

(73) Assignee: Central Glass Company, Limited, Ube-shi (JP)

( * ) Notice: Subject to any disclaimer, the term of this patent is extended or adjusted under 35 U.S.C. 154(b) by 580 days.

This patent is subject to a terminal disclaimer.

(21) Appl. No.: 12/377,439

(22) PCT Filed: Aug. 22, 2007

(86) PCT No.: PCT/JP2007/066253
§ 371 (c)(1),
(2), (4) Date: Feb. 13, 2009

(87) PCT Pub. No.: WO2008/029620
PCT Pub. Date: Mar. 13, 2008

(65) Prior Publication Data
US 2010/0227159 A1 Sep. 9, 2010

(30) Foreign Application Priority Data
Sep. 8, 2006 (JP) .................. 2006-243650

(51) Int. Cl.
*B32B 17/06* (2006.01)
*C03C 17/25* (2006.01)
*B05D 3/02* (2006.01)

(52) U.S. Cl. .............. 428/328; 427/387; 427/389.7; 428/331; 428/336; 428/428; 428/429

(58) Field of Classification Search ............... 427/387, 427/389.7; 428/328, 331, 336, 428, 429
See application file for complete search history.

(56) References Cited

U.S. PATENT DOCUMENTS
2005/0164014 A1 7/2005 Tomonaga et al.
2005/0215076 A1 9/2005 Costa et al.

FOREIGN PATENT DOCUMENTS
| JP | 7-70482 A | 3/1995 |
| JP | 8-41441 A | 2/1996 |
| JP | 2003-55603 A | 2/2003 |
| JP | 2003-64308 A | 3/2003 |
| JP | 2005-247587 A | 9/2005 |
| JP | 2005-532974 A | 11/2005 |
| WO | WO 2004/011381 A1 | 2/2004 |

OTHER PUBLICATIONS

International Search Report dated Oct. 2, 2007 with an English translation of the pertinent portions (Six (6) pages).
Chinese Office Action including English translation dated Jan. 26, 2011 (Twelve (12) pages).

*Primary Examiner* — D. S. Nakarani
(74) *Attorney, Agent, or Firm* — Crowell & Moring LLP

(57) ABSTRACT

A heat ray shielding glass for vehicle, including a glass substrate and a heat ray shielding film formed on at least one surface of the glass substrate, in which the heat ray shielding film includes: conductive oxide ultrafine particles dispersed in the film; and a silica binder for binding the ultrafine particles to each other, the silica binder including solid contents produced by hydrolysis and polycondensation of tetraalkoxysilane and trialkoxysilane.

3 Claims, No Drawings

HEAT RAY SHIELDING GLASS FOR VEHICLE AND PROCESS FOR PRODUCING THE SAME

TECHNICAL FIELD

The present invention relates to a heat ray shielding glass for vehicle window, and a process for producing the same.

BACKGROUND ART

In recent years, a heat ray shielding glass has received widespread attention for improving comfortableness and cooling efficiency in the interior of a room or a vehicle. However, the heat ray shielding glass of a type produced by forming a conductive film on a glass surface is not recommended when required to be able to transmit radio waves having wavelength ranges applied to cellular phone, TV, radio, ITS and the like.

Against the above background, studies have been made on a heat ray shielding glass produced in such a manner as to apply a treating agent obtained by mixing conductive ultrafine particles and a binder component to a glass surface thereby forming a heat ray shielding film. Examples of the treating agent, disclosed in Patent Documents 1 to 4, are produced by mixing ITO fine powder with a binder component formed of alkoxide of Si, Al, Zr, Ti or the like or formed of an organic resin, with which a substrate having a heat ray cutoff effect is obtained.

Patent Document 1: Japanese Patent Provisional Publication No. 07-070482
Patent Document 2: Japanese Patent Provisional Publication No. 08-041441
Patent Document 3: Japanese Patent Provisional Publication No. 2003-064308
Patent Document 4: Japanese Patent Provisional Publication No. 2003-055603

DISCLOSURE OF INVENTION

Problems to be Solved by Invention

When the heat ray shielding glass produced by forming the heat ray shielding film on the glass substrate surface is used for the vehicle window, however, some properties other than a radio wave transmission property are also required. For example, an upwardly and downwardly operable glass window installed to a vehicle door is in contact with a molding for stripping water (a door belt molding), and therefore abrasion occurs between the film formed on the glass substrate and the door belt molding contacted with the film when the glass window is operated upwardly or downwardly.

At this time, the abrasion may make scratches on the heat ray shielding film so as to deteriorate the quality in terms of appearance, which is therefore not preferable. Additionally, an insufficient sliding property on the surface of the heat ray shielding film brings about friction when the glass window is operated upwardly or downwardly, thereby generating abnormal noise. The occurrence of abnormal noise is not preferable since it gives occupants uneasiness.

In view of the above, the heat ray shielding film formed on the heat ray shielding glass used for the upwardly and downwardly operable glass window is required to have a high film hardness and a sliding property on the surface.

Means for Solving Problems

In order to solve the above problems, in the present invention, an eager study was made on the heat ray shielding glass for vehicle on which the heat ray shielding film is formed. The heat ray shielding film contains conductive oxide ultrafine particles dispersed in the film, and a silica binder for binding the ultrafine particles to each other. In the thus developed heat ray shielding glass, scratches and abnormal noise are difficult to occur even when the film is in contact with some component mounted on the vehicle to cause friction. Incidentally, the friction includes that made by a contact between the door belt molding and the film formed on the glass substrate.

Therefore, an aspect of the present invention resides in a heat ray shielding glass for vehicle which glass includes a glass substrate and a heat ray shielding film formed on at least one surface of the glass substrate, in which the heat ray shielding film comprises: conductive oxide ultrafine particles dispersed in the film; and a silica binder for binding the ultrafine particles to each other, the silica binder including solid contents produced by hydrolysis and polycondensation of tetraalkoxysilane and trialkoxysilane. In the heat ray shielding film of the heat ray shielding glass, a ratio between the solid content made from the tetraalkoxysilane and the solid content made from the trialkoxysilane is within a range of from 55:45 to 85:15 on a weight percentage basis, and a ratio between the conductive oxide ultrafine particles and the silica binder is within a range of from 35:65 to 70:30 on a weight percentage basis.

An object of the present invention is to provide a heat ray shielding glass in which scratches and abnormal noise are hard to occur even when the film is in contact with some component mounted on the vehicle to cause friction, which can be achieved by so producing the silica binder as to consist of solid contents obtained by hydrolysis and polycondensation of tetraalkoxysilane and trialkoxysilane.

Alkoxy groups that alkoxysilane has are to form strong siloxane bonds by hydrolysis and polycondensation. The tetraalkoxysilane in which all four functional groups linked to a silicon atom are alkoxy groups is to form a dense network of siloxane by hydrolysis and polycondensation, thereby contributing to enhancement of the film hardness.

However, in order to obtain an excellent heat ray shielding property while highly maintaining the radio wave transmission property, the heat ray shielding film is required to have a certain extent of film thickness, preferably a film thickness ranging from 0.8 to 3 μm. However, in a case where the film is formed to have a large thickness, a stress that occurs while the film applied to the substrate is getting dried is high so that cracks are easily made on the film.

The occurrence of cracks can be prevented if the binder has enough flexibility to ease the stress. For this purpose the trialkoxysilane having three alkoxy groups is employed in the present invention. A solid content made from the trialkoxysilane has an excellent flexibility since it does not form the siloxane network densely, and therefore suitably eases the stress (that occurs during a drying process for film-formation) thereby contributing to prevention of the crack occurrence.

It is found from the above to be possible to achieve the object of providing a heat ray shielding glass in which abnormal noise and scratches are hard to occur on the film even when the film is in contact with some component mounted on the vehicle to cause friction, if a ratio based on weight percentage between the solid contents made from both kinds of the alkoxysilanes in the silica binder and a ratio based on weight percentage between the silica binder and the conductive oxide ultrafine particles are optimized.

In the present invention, as the ratio between the solid contents made from the alkoxysilanes in the silica binder, the ratio between the solid content made from the tetraalkoxysilane and the solid content made from the trialkoxysilane is set within a range of from 55:45 to 85:15 on a weight percentage basis. When the solid content made from the tetraalkoxysilane exceeds 85 wt %, cracks are generated on the formed film. Meanwhile, when the solid content made from the trialkoxysilane exceeds 45 wt % and when friction occurs due to contact between the film and some component mounted on the vehicle, abnormal noise and scratches are easily made on the film. Further, the above-discussed ratio is preferably within a range of from 60:40 to 80:20 on a weight percentage basis, in order to prevent the occurrence of cracks, scratches and abnormal noise over a long period of use.

In the present invention, the ratio between the conductive oxide ultrafine particles and the silica binder is within a range of from 35:65 to 70:30 on a weight percentage basis. When the conductive oxide ultrafine particles are less than 35 wt %, the heat ray shielding property is not sufficiently obtained. Meanwhile, the conductive oxide ultrafine particles exceeding 70 wt % is also not preferable since the amount of the binder is so small as to lose the capability of sufficiently firmly binding the conductive oxide ultrafine particles thereby lowering the film hardness. Additionally, the ratio between the conductive oxide ultrafine particles and the silica binder is preferably set within a range of from 45:55 to 60:40 on a weight percentage basis in order to highly obtain both the heat ray shielding property and the film hardness.

Further, it is preferable that the conductive oxide ultrafine particles have an average particle size of not larger than 200 nm. Light is scattered most when particles have an average particle size of half of the wavelength of the light. In order to obtain a heat ray shielding film having a high transparency, therefore, the conductive oxide ultrafine particles preferably have an average particle size of not larger than one half of the visible light's shortest wavelength (400 nm), i.e. an average particle size of not larger than 200 nm, more preferably not larger than 100 nm in order to obtain a particularly excellent transparency. The average particle size is measured by a method according to JIS H 7804 (established in 2005). This method targets particles having an average particle size of not larger than 100 nm, but in the present invention it is applied to those having an average particle size of larger than 100 nm.

Preferable examples of the conductive oxide ultrafine particles are tin-doped indium oxide (hereinafter, sometimes referred to as ITO) and antimony-doped tin oxide (hereinafter, sometimes referred to as ATO). In the present invention, it is preferable to use the ITO ultrafine particles rather than the ATO ultrafine particles. ITO is known for the property of absorbing near-infrared having wavelengths of not shorter than 1000 nm. It is commonly known that every substance has its own plasma resonance frequency, and that a light longer in wavelength than the frequency is obstructed by the substance while a light shorter than the frequency is transmitted through the substance. The plasma resonance frequency is known to shift to a shorter wavelength side as the conduction electron density increases. ITO has a high conduction electron density as compared with other transparent conductive material such as ATO and therefore obstructs a light having wavelengths of from about 1000 to 1300 nm, which means that ITO is excellent in efficiency of near-infrared obstruction.

Further, another aspect of the present invention resides in a process for producing the heat ray shielding glass for vehicle. The process comprises the steps of: (i) preparing a sol solution for forming the silica binder by the hydrolysis and the polycondensation of the tetraalkoxysilane and the trialkoxysilane; (ii) preparing a treating agent by mixing the conductive oxide ultrafine particles, preferably the dispersed solution of the conductive oxide ultrafine particles, with the sol solution; and (iii) applying the treating agent to the glass substrate for vehicle and then performing a heat treatment on the glass substrate at a temperature ranging from 120 to 250° C.

In the process for producing the heat ray shielding glass for vehicle according to the present invention, it is preferable that the vehicle glass coated with the treating agent is subjected to a heat treatment at a temperature ranging from 120 to 250° C. With this heat treatment, a solvent and water content which exist in the film are evaporated so as to densify the film. Additionally, hydrolysis and polycondensation of binder components proceed to make the siloxane network denser, so that the film hardness increases.

Therefore, the temperature applied in the heat treatment is preferably not lower than 120° C. above which the solvent and water content can be sufficiently evaporated and hydrolysis and polycondensation of the binder components can sufficiently proceed, more preferably not lower than 150° C.

However, as the temperature applied in the heat treatment increases, the conductive oxide ultrafine particles are oxidized to reduce the heat ray shielding property. In addition to this, organic groups that the trialkoxysilane existing in the binder components has are subjected to thermal decomposition so that discoloration of the film into yellow comes to easily occur. Further, an active functional group such as a silanol group is produced by thermal decomposition so as to lower the sliding property on the surface of the film. Accordingly, the temperature applied in the heat treatment is preferably not higher than 250° C., more preferably not higher than 230° C. in order to minimize reductions in heat ray shielding property and in sliding property on the surface as much as possible.

Effects of Invention

The heat ray shielding glass for vehicle according to the present invention is high in visible light transmittance, heat ray shielding property and film hardness, and additionally to be subjected to neither scratches nor abnormal noise even if the film is in contact with some component mounted on the vehicle to cause friction. Therefore, it is preferably used as a heat ray shielding glass for vehicle.

BEST MODE FOR CARRYING OUT INVENTION

A heat ray shielding glass for vehicle, according to the present invention, includes a glass substrate and a heat ray shielding film formed on at least one surface of the glass substrate. The heat ray shielding film contains conductive oxide ultrafine particles and a silica binder including solid contents produced by hydrolysis and polycondensation of tetraalkoxysilane and trialkoxysilane.

Examples of the tetraalkoxysilane are tetramethoxysilane, tetraethoxysilane, tetrapropoxysilane tetraisopropoxysilane, and combinations thereof.

Examples of the trialkoxysilane are: hydrocarbon group-containing trialkoxysilanes such as methyltrimethoxysilane, ethyltrimethoxysilane, propyltrimethoxysilane, isopropyltrimethoxysilane, butyltrimethoxysilane, isobutyltrimethoxysilane, phenyltrimethoxysilane, methyltriethoxysilane, ethyltriethoxysilane, propyltriethoxysilane, isopropyltriethoxysilane, butyltriethoxysilane, isobutyltriethoxysilane, phenyltriethoxysilane, methyltripropoxysilane, ethyltripropoxysilane, propyltripropoxysilane, isopropyltripropoxysilane, butyltripropoxysilane, isobutyltripropoxysilane, phenyltripropoxysilane, methyltriisopropoxysilane, ethyltriisopropoxysilane, propyltriisopropoxysilane, isopropyltriisopropoxysilane, butyltriisopropoxysilane, isobutyltriisopropoxysilane and phenyltriisopropoxysilane; reactive organic group-containing trialkoxysilanes such as 3-glycidoxypropyltrimethoxysilane, 3-glycidoxypropyltriethoxysilane, 5,6-epoxyhexyltrimethoxysilane, 5,6-epoxyhexyltriethoxysilane, 2-(3,4-epoxycyclohexyl)ethyltrimethoxysilane, 2-(3,4-epoxycyclohexyl)ethyltriethoxysilane and 3-ethyl-3-[{3-(triethoxysilyl)propoxy}methyl]oxetane; and combinations thereof.

It is preferable that a functional group that the trialkoxysilane has in addition to alkoxy groups is small in size or interacts with a silica network, in order to obtain a high film hardness. Examples of the functional group are methyltrialkoxysilanes such as methyltrimethoxysilane and methyltriethoxysilane, and the reactive organic group-containing trialkoxysilanes.

Additionally, a functional material may be added to the heat ray shielding film of the present invention in order to provide the heat ray shielding glass with a further function. For example, a benzophenone derivative, a benzotriazole derivative, titanium oxide fine particles, zinc oxide particles or the like may be added for the purpose of cutting off ultraviolet.

The glass substrate used in the heat ray shielding glass for vehicle according to the present invention is preferably an inorganic glass substrate having transparency, such as the soda-lime glass produced by the float process or the roll-out process commonly employed in producing the glass substrate for vehicle. The glass substrate may be either colorless or colored and may be combined with other functional films. Further, the glass substrate is allowed to be in any of various forms.

Additionally, the glass substrate may be replaced with a resinous substrate such as polyethylene terephthalate resin, polycarbonate resin, polyvinyl chloride resin and polyethylene resin.

In recent years, green glass which absorbs wavelengths of from 700 to 1100 nm has been widely used in vehicle. Since the heat ray shielding film formed on the heat ray shielding glass of the present invention cuts off infrared having wavelengths of not shorter than about 1000 nm, it is preferable to form the heat ray shielding film on a green glass substrate. With this, a heat ray shielding glass which can cut off infrared having wavelengths of wide range can be obtained while maintaining a visible light transmittance enough for the vehicle window to meet laws and regulations, i.e. a visible light transmittance of not less than 70%.

Hereinafter, a procedure for producing the heat ray shielding glass according to the present invention will be discussed.

The heat ray shielding glass according to the present invention is produced by the steps of: (i) preparing a sol solution for forming a silica binder by hydrolysis and polycondensation of tetraalkoxysilane and trialkoxysilane; (ii) preparing a treating agent by mixing a conductive oxide ultrafine particles with the sol solution; and (iii) applying the treating agent to a glass substrate for vehicle and then performing a heat treatment on the glass substrate at a temperature ranging from 120 to 250° C.

The sol solution is prepared from the tetraalkoxysilane and the trialkoxysilane, for example, as follows. The alkoxysilanes are mixed with a solvent in certain amounts by stirring (for example, for about 30 minutes), thereby obtaining a solution "A". On the other hand, an acid aqueous solution is mixed with the above-mentioned solvent with stirring thereby obtaining a solution "B". Then, the solutions "A" and "B" are mixed and then stirred so as to develop the hydrolysis and the polycondensation of the alkoxysilanes, thereby obtaining the sol solution. A film made from the sol solution is poor in appearance and sliding property on the surface in a case where the hydrolysis and the polycondensation are not adequately developed, and poor in film hardness in a case where the hydrolysis and the polycondensation are excessively developed. Therefore, both cases are not preferable. Incidentally, it is preferable to carry out the stirring at 20 to 45° C. since the hydrolysis and the polycondensation can proceed to a moderate level within about 1 hour to 1 day. However, in the present invention, the stirring condition is not limited to the above as far as the hydrolysis and the polycondensation can proceed to the moderate level. Though the present invention uses at least two kinds of alkoxysilanes in total since it uses at least one kind of tetraalkoxysilane and at least one kind of trialkoxysilane, the hydrolysis and the polycondensation may be performed on each of the alkoxysilanes separately or on them together. The method of preparing the sol solution is not limited to the above-discussed method; however, it is preferable to employ the method as discussed above in which the alkoxysilanes diluted with the solvent and the acid aqueous solution diluted with the solvent are mixed drop by drop, since an explosive reaction can be avoided and a steadier reaction can be obtained.

Examples of acid used in the acid aqueous solution are: inorganic acids such as hydrochloric acid, sulfuric acid and nitric acid; organic acids such as acetic acid, phthalic acid and succinic acid; and combinations thereof. The acid is selected from these examples in accordance with a reaction velocity for the hydrolysis and the polycondensation of an alkoxysilane used therein, and preferably has a pH value of 0 to 5. Particularly preferable examples are acetic acid and phthalic acid since these are easily prepared to have the above-mentioned pH value.

It is preferable to use chemical species having a hydroxyl group, singly or in combination, as the solvent. Such a solvent is high in compatibility with alkoxysilanes and the acid aqueous solution, so that a homogenous solution can be obtained even when the alkoxysilanes and the acid aqueous solution are mixed, with which a steady reaction is achieved. Further, when a glass substrate is employed and when the solvent is the chemical species having a hydroxyl group, there is the effect that the treating agent has a good wettability against the substrate and that a film with a good appearance is readily obtained.

Examples of the chemical species having a hydroxyl group are: alcohol-based solvents such as ethyl alcohol, propyl alcohol, butanol, ethylene glycol, 1,2-propanediol and cyclohexanol; cellosolve-based solvents such as ethylene glycol monomethyl ether, ethylene glycol monoethyl ether, ethylene glycol monobutyl ether, ethylene glycol monoisoamyl ether and ethylene glycol monophenyl ether; and propylene glycol monoalkyl ether based-solvents such as propylene glycol monomethyl ether, propylene glycol monoethyl ether and propylene glycol monobutyl ether.

Then, the sol solution is mixed with the conductive oxide ultrafine particles, preferably mixed with a solution in which the conductive oxide ultrafine particles are dispersed, thereby obtaining the treating agent. At this time, the above-discussed solvent may be added thereto in order to control a solid content concentration of the treating agent. Additionally, it is preferable to use the above-discussed solvent as the solvent in which the conductive oxide ultrafine particles are dispersed.

Further, a very small amount of levelling agent may be added to the treating agent for the purpose of improving a levelling property. A preferable example of the levelling agent is a silicone-based levelling agent having water solubility.

Then, the glass substrate is coated with the treating agent. Examples of the coating method are hand coating, flow coating including that uses a nozzle, dip coating, spray coating, reverse roll coating, flexography, print processes, flow coating, spin coating, and suitable combinations thereof.

After applying the treating agent to the glass substrate, followed by some processes such as drying and heat treatment, the heat ray shielding glass is obtained. In a case of being formed on only one surface of the glass substrate used as a vehicle glass, the heat ray shielding film is preferably formed on a surface which faces to the interior of the vehicle. The reason therefor is that the heat ray shielding film formed facing to the interior of the vehicle is free from scratches caused by sprung stones or mischief and therefore seldom reduced in appearance.

EXAMPLES

Examples of the present invention will be discussed hereinafter.
[Method for Evaluating Heat Ray Shielding Glass]
(i) Appearance
The appearance of the heat ray shielding glass was visually observed whether or not the glass had transparency, color or cracks, upon which the heat ray shielding glass having no problem was evaluated as pass "A" while that having some problem was evaluated as fail "C".
(ii) Optical Property
By using U-4000 available from Hitachi, Ltd., spectral transmittance of the heat ray shielding glass was measured. Based on the thus obtained data, solar transmittance (Ts), visible light transmittance (YA) and transmittances at wavelengths of 1.4 and 2.0 μm ($T_{1.4}$ and $T_{2.0}$) were determined, where Ts and YA were obtained in conformity with "JIS R 3106 (established in 1998)" and "JIS R 3212 (established in 1998)", respectively. A sample having Ts of not larger than 50%, $T_{1.4}$ of not larger than 15% and $T_{2.0}$ of not larger than 5% was evaluated as having a heat ray shielding property sufficient for the vehicle glass. Additionally, a sample having YA of not smaller than 70% was evaluated as having a sufficient visible light transmittance. A haze value was measured by using NDH2000 available from NIPPON DENSHOKU INDUSTRIES CO., LTD., in accordance with "JIS R 3212 (established in 1998)", and then a sample having a haze value of not larger than 0.5% was evaluated as being above the level of no problem as the vehicle glass in practical use.
(iii) Steel Wool (SW) Abrasion Resistance Test
A treated surface of the heat ray shielding glass was polished with 10 reciprocating motions of a steel wool (available from Nihon Steel Wool Co., Ltd. under the trade name of Bon Star No. 0000) to which a load of 2.5 kg/cm$^2$ is applied. The degree of scratches made on the polished portion was visually observed on a scale of 1 to 5 and evaluated as "no scratch", "slight scratch", "middling scratch", "serious scratch" and "peeled off". Then, the heat ray shielding glass having slighter scratches than "middling scratch" was evaluated as being excellent in film hardness and represented by "B". Further, the heat ray shielding glass having slighter scratches than "slight scratch" was evaluated as being particularly excellent in film hardness and represented by "A". Furthermore, "serious scratch" and "peeled off" were evaluated as being inferior in film hardness and represented by "C".
(iv) Sliding Property on the Surface of Film
A weight (weight: 220 g, bottom surface: 67 mm×67 mm) wrapped in a cotton cloth was set on a surface of a sample. Then, the sample was gradually inclined in order to measure an inclination angle that the sample had at the time that the weight started slipping down on the sample. The heat ray shielding glass that had an inclination angle of not larger than 30° was evaluated as being excellent in sliding property on the surface.
(v) Up-and-Down Movement Test in Actual Vehicle Door
A front door glass with the heat ray shielding film was installed to a front door panel of an actual vehicle and then an up-and-down reciprocating movement of the glass was repeated 20,000 times. The glass with which abnormal noise due to friction caused against a molding of the door panel was not generated during the up-and-down reciprocating movements was evaluated as pass "A", while that generated abnormal noise was evaluated as fail "C". In addition to this, the glass whose heat ray shielding film was not subjected to scratch even after 20,000 repetitions of the up-and-down movement was evaluated as pass "A", while that on which scratch was made was evaluated as fail "C".
(vi) Surface Resistance Value
A surface resistance value was measured by using MEGARESTA available from SHISHIDO ELECTROSTATIC, LTD. It is generally said that a surface resistance value exceeding 100 MΩ exhibits a radio wave transmittance equal to that of a common glass. Therefore, the heat ray shielding glass having a surface resistance value exceeding 100 MΩ was evaluated as having a good radio wave transmittance.
(vii) Film Thickness
The heat ray shielding film was cut with a cutter knife and measurement was carried out thereon by using SURFCORDER ET4000A available from Kosaka Laboratory Ltd. in a step height measuring mode.

Example 1

Preparation of Sol Solution

Tetraethoxysilane ($Si(OC_2H_5)_4$, referred to as TEOS) and methyltriethoxysilane ($CH_3Si(OC_2H_5)_3$, referred to as MTES) were used as tetraalkoxysilane and trialkoxysilane, respectively.
A sol solution was prepared by mixing 25.41 g of TEOS, 8.47 g of MTES, 24.63 g of propylene glycol monoethyl ether and 16.50 g of 0.5 N acetic acid with stirring at 40° C. for 15 hours. In the sol solution, a ratio between a solid content made from the tetraalkoxysilane and that made from the trialkoxysilane was 70:30 on a weight percentage basis.
(Preparation of Treating Agent)
ITO ultrafine particles having an average particle size of 50 nm were used as conductive oxide ultrafine particles. 35.55 g of a dispersion liquid of the ultrafine particles (ITO ultrafine particles concentration: 30 wt %, solvent: isopropyl alcohol, available from Mitsubishi Materials Corporation) was mixed into the sol solution obtained in "Preparation of Sol Solution", thereby obtaining a treating agent. In the treating agent, a ratio between the ITO ultrafine particles and a total of the solid contents made from the tetraalkoxysilane and the trialkoxysilane was 50:50 on a weight percentage basis, the total of the solid contents being hereinafter referred to as "a binder solid content".
(Preparation of Substrate)
As a glass substrate for obtaining the heat ray shielding glass evaluated as discussed in the sections (ii), (iv) and (vi) of "Method for Evaluating Heat Ray Shielding Glass", a UV green glass (Ts=46%, YA=74%, $T_{1.4}$=24% and $T_{2.0}$=47%) in the form of a 300 mm×300 mm×3.5 mm (thickness) flat plate was prepared. On the other hand, a front door glass of an actual vehicle was prepared as a glass substrate for obtaining the heat ray shielding glass evaluated as discussed in the sections (i), (iii) and (v) of "Method for Evaluating Heat Ray Shielding Glass". A surface of each of the glass substrates was polished with a polishing liquid, rinsed in water and then dried, in which the used polishing liquid was a 2 wt % ceria slurry obtained by mixing a glass polishing agent MIREK A (T) (available from MITSUI MINING & SMELTING CO., LTD.) into water.

(Production of Heat Ray Shielding Glass)

A cotton cloth (available under the trade name of BEM-COT) was impregnated with the treating agent obtained in "Preparation of Treating agent". Then, the rinsed surface of the glass substrate obtained in the "Preparation of Substrate" was wiped with the cotton cloth thereby applying the treating agent to the substrate.

Thereafter, a heat treatment was carried out for 10 minutes so that the substrate had a temperature of 200° C., thereby obtaining a heat ray shielding glass. As a result of making evaluation in accordance with "Method for Evaluating Heat Ray Shielding Glass", it was found that the obtained substrate had no problem of appearance and excellent in both heat ray shielding property and visible light transmittance. Further, this substrate was good in the SW abrasion resistance test since evaluated as "slight scratch", and additionally good in sliding property on the surface since it measured 23°. Furthermore, this substrate generated neither scratch nor abnormal noise in the up-and-down movement test in an actual vehicle door.

Additionally, the heat ray shielding glass produced by using each of the two glass substrates was cut or broken, and then a cross section thus provided to a heat ray shielding film was observed by a scanning electron microscope in accordance with JIS H 7804 (established in 2005). As a result of this, the ITO ultrafine particles of either heat ray shielding glass had an average particle size of 50 nm. In addition to this, both heat ray shielding glasses had the same thickness, i.e. a thickness of 1.4 μm.

TABLE 1

| | Raw material | | | | Composition (solid matter ratio on weight percentage basis) | | Temperature in preparation of binder (° C.) | Temperature in calcination heat treatment temperature (° C.) |
|---|---|---|---|---|---|---|---|---|
| Item | Tetraalkoxysilane ($Si_4$) | Trialkoxysilane ($Si_3$) | Acid catalyst | Heat ray shielding component | Additive | $Si_4$-originated: $Si_3$-originated | Heat ray shielding content: binder solid content | |
| Example 1 | TEOS | MTES | 0.5N Acetic acid | ITO fine particles | — | 70:30 | 50:50 | 40 | 200 |
| Example 2 | TEOS | MTES | 0.5N Acetic acid | ITO fine particles | — | 70:30 | 50:50 | 40 | 140 |
| Example 3 | TEOS | MTES | 0.5N Acetic acid | ITO fine particles | — | 60:40 | 50:50 | 40 | 200 |
| Example 4 | TEOS | MTES | 0.5N Acetic acid | ITO fine particles | — | 70:30 | 40:60 | 40 | 200 |
| Example 5 | TEOS | MTES | 0.5N Acetic acid | ITO fine particles | — | 70:30 | 65:35 | 40 | 200 |
| Example 6 | TEOS | GPTMS | 0.5N Acetic acid | ITO fine particles | — | 70:30 | 50:50 | 35 | 200 |
| Example 7 | TEOS | OPTES | 0.5N Acetic acid | ITO fine particles | — | 70:30 | 50:50 | 40 | 200 |
| Example 8 | TEOS TMOS | GPTMS | 0.5N Acetic acid | ITO fine particles | — | 70:30 | 50:50 | 35 | 200 |
| Example 9 | TEOS | MTES + GPTMS | 0.5N Acetic acid | ITO fine particles | — | 70:30 | 50:50 | 35 | 200 |
| Example 10 | TEOS | MTES | 0.5N Acetic acid | ITO fine particles | DBDA | 70:30 | 50:50 | 40 | 200 |
| Example 11 | TEOS | MTES | 0.5N Acetic acid | ITO fine particles | — | 70:30 | 50:50 | 35 | 200 |
| Comparative Example 1 | — | MTES | 0.5N Acetic acid | ITO fine particles | — | 0:100 | 50:50 | 40 | 200 |
| Comparative Example 2 | TEOS | MTES | 0.5N Acetic acid | ITO fine particles | — | 50:50 | 50:50 | 40 | 200 |
| Comparative Example 3 | TEOS | — | 0.5N Acetic acid | ITO fine particles | — | 100:0 | 50:50 | 40 | 200 |
| Comparative Example 4 | TEOS | MTES | 0.5N Acetic acid | ITO fine particles | — | 90:10 | 50:50 | 40 | 200 |
| Comparative Example 5 | TEOS | MTES | 0.5N Acetic acid | ITO fine particles | — | 70:30 | 30:70 | 40 | 200 |
| Comparative Example 6 | TEOS | MTES | 0.5N Acetic acid | ITO fine particles | — | 70:30 | 75:25 | 40 | 200 |
| Comparative Example 7 | TEOS | MTES | 0.5N Acetic acid | ITO fine particles | — | 70:30 | 50:50 | 40 | 300 |
| Comparative Example 8 | TEOS | MTES | 0.5N Acetic acid | ITO fine particles | — | 70:30 | 50:50 | 40 | 80 |

TABLE 1-continued

| Item | Initial Appearance | haze (%) | Optical property YA | Ts | $T_{1.4}$ | $T_{2.0}$ | SW abrasion resistance test | Sliding property on surface (°) | Up-and-down movement test in actual vehicle door Scratch | Abnormal noise | Surface resistance (MΩ) | Film thickness (μm) |
|---|---|---|---|---|---|---|---|---|---|---|---|---|
| Example 1 | A (Good) | 0.2 | 72 | 42 | 11 | 2 | A (Slight scratch) | 23 | A (No scratch) | A (No noise) | >10$^6$ | 1.4 |
| Example 2 | A (Good) | 0.2 | 72 | 42 | 7 | 2 | B (Middling scratch) | 23 | A (No scratch) | A (No noise) | >10$^6$ | 1.4 |
| Example 3 | A (Good) | 0.2 | 72 | 42 | 11 | 2 | B (Middling scratch) | 27 | A (No scratch) | A (No noise) | >10$^6$ | 1.4 |
| Example 4 | A (Good) | 0.2 | 72□73 | 42 | 11 | 4 | B (Middling scratch) | 25 | A (No scratch) | A (No noise) | >10$^6$ | 1.2 |
| Example 5 | A (Good) | 0.2 | 72□71 | 42 | 5 | 1 | B (Middling scratch) | 22 | A (No scratch) | A (No noise) | >10$^6$ | 1.4 |
| Example 6 | A (Good) | 0.2 | 72 | 42 | 11 | 2 | A (No scratch) | 23 | A (No scratch) | A (No noise) | >10$^6$ | 1.3 |
| Example 7 | A (Good) | 0.2 | 73□72 | 42 | 10 | 2 | A (Slight scratch) | 25 | A (No scratch) | A (No noise) | >10$^6$ | 1.3 |
| Example 8 | A (Good) | 0.2 | 71□72 | 42 | 11 | 2 | A (No scratch) | 25 | A (No scratch) | A (No noise) | >10$^6$ | 1.3 |
| Example 9 | A (Good) | 0.2 | 72 | 42 | 11 | 2 | A (Slight scratch) | 22 | A (No scratch) | A (No noise) | >10$^6$ | 1.4 |
| Example 10 | A (Good) | 0.2 | 72 | 42 | 11 | 2 | A (Slight scratch) | 23 | A (No scratch) | A (No noise) | >10$^6$ | 1.4 |
| Example 11 | A (Good) | 0.2 | 72 | 42 | 11 | 2 | B (Middling scratch) | 27 | A (No scratch) | A (No noise) | >10$^6$ | 1.4 |
| Comparative Example 1 | A (Good) | 0.2 | 72 | 42 | 11 | 2 | C (Peeled off) | 38 | C (Peeled off) | C (Some noise) | >10$^6$ | 1.4 |
| Comparative Example 2 | A (Good) | 0.2 | 72 | 42 | 11 | 2 | B (Middling scratch) | 38 | A (No scratch) | C (Some noise) | >10$^6$ | 1.4 |
| Comparative Example 3 | C (Cracks) | — | — | — | — | — | — | — | — | — | — | — |
| Comparative Example 4 | C (Cracks) | — | — | — | — | — | — | — | — | — | — | — |
| Comparative Example 5 | A (Good) | 0.2 | 73 | 43 | 12 | 5 | C (Serious scratch) | 28 | C (Some scratch) | A (No noise) | >10$^6$ | 1.2 |
| Comparative Example 6 | A (Good) | 0.2 | 71 | 41 | 3 | 0 | C (Serious scratch) | 21 | C (Some scratch) | A (No noise) | >10$^6$ | 1.4 |
| Comparative Example 7 | C (Discolored yellow) | 0.3 | 72 | 45 | 28 | 16 | B (Middling scratch) | 45 | A (No scratch) | C (Some noise) | >10$^6$ | 1.4 |
| Comparative Example 8 | A (Good) | 0.2 | 72 | 40 | 6 | 1 | C (Peeled off) | 23 | C (Peeled off) | A (No noise) | >10$^6$ | 1.4 |

Example 2

A procedure of Example 1 was repeated with the exception that the heat treatment of the heat ray shielding glass was carried out at a temperature of 140° C., thereby obtaining a heat ray shielding glass. As a result, the obtained substrate had no problem of appearance and was excellent in both heat ray shielding property and visible light transmittance. Further, this substrate was good in the SW abrasion resistance test since it was evaluated as having "middling scratch", and additionally good in sliding property on the surface since it measured 23°. Furthermore, this substrate generated neither scratch nor abnormal noise in the up-and-down movement test in the actual vehicle door.

Example 3

A procedure of Example 1 was repeated with the exception that a ratio between the solid content made from the tetraalkoxysilane and the solid content made from the trialkoxysilane was set to be 60:40 on a weight percentage basis, thereby obtaining a heat ray shielding glass. As a result, the obtained substrate had no problem of appearance and was excellent in both heat ray shielding property and visible light transmittance. Further, this substrate was good in the SW abrasion resistance test since it was evaluated as having "middling scratch", and additionally good in sliding property on the surface since it measured 27°. Furthermore, this substrate generated neither scratch nor abnormal noise in the up-and-down movement test in the actual vehicle door.

Example 4

A procedure of Example 1 was repeated with the exception that a ratio between a heat ray shielding component and the binder solid content was set to be 40:60 on a weight percentage basis, thereby obtaining a heat ray shielding glass. As a result, the obtained substrate had no problem of appearance and was excellent in both heat ray shielding property and visible light transmittance. Further, this substrate was good in the SW abrasion resistance test since it was evaluated as having "middling scratch", and additionally good in sliding property on the surface since it measured 25°. Furthermore, this substrate generated neither scratch nor abnormal noise in the up-and-down movement test in the actual vehicle door.

Example 5

A procedure of Example 1 was repeated with the exception that a ratio between a heat ray shielding component and the binder solid content was set to be 65:35 on a weight percentage basis, thereby obtaining a heat ray shielding glass. As a result, the obtained substrate had no problem of appearance and was excellent in both heat ray shielding property and visible light transmittance. Further, this substrate was good in the SW abrasion resistance test since it was evaluated as having "middling scratch", and additionally good in sliding property on the surface since it measured 22°. Furthermore, this substrate generated neither scratch nor abnormal noise in the up-and-down movement test in the actual vehicle door.

Example 6

A procedure of Example 1 was repeated with the exception, in "Preparation of Sol Solution", that 3-glycidoxypropyltrimethoxysilane (GPTMS) represented by the following formula (1) was used as the trialkoxysilane and that the stirring was carried out at 35° C., thereby obtaining a heat ray shielding glass. As a result, the obtained substrate had no problem of appearance and was excellent in both heat ray shielding property and visible light transmittance. Further, this substrate had no scratch in the SW abrasion resistance test so as to be excellent in film hardness, and was good in sliding property on the surface since it measured 23°. Furthermore, this substrate generated neither scratch nor abnormal noise in the up-and-down movement test in the actual vehicle door.

Chemical Formula (1)

Example 7

A procedure of Example 1 was repeated with the exception, in "Preparation of Sol Solution", that 3-ethyl-3-[{3-(triethoxysilyl)propoxy}methyl]oxetane represented by the following formula (2) was used as the trialkoxysilane and that 0.5 N nitric acid was used as an acid catalyst, thereby obtaining a heat ray shielding glass. As a result, the obtained substrate had no problem of appearance and was excellent in both heat ray shielding property and visible light transmittance. Further, this substrate was good in the SW abrasion resistance test since it was evaluated as having "slight scratch", and additionally good in sliding property on the surface since it measured 25°. Furthermore, this substrate generated neither scratch nor abnormal noise in the up-and-down movement test in the actual vehicle door.

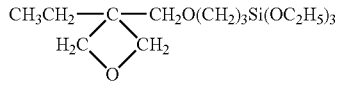

(Chemical Formula (2))

Example 8

A procedure of Example 6 was repeated with the exception that tetramethoxysilane (TMOS) was used as the tetraalkoxysilane in "Preparation of Sol Solution", thereby obtaining a heat ray shielding glass. As a result, the obtained substrate had no problem of appearance and was excellent in both heat ray shielding property and visible light transmittance. Further, this substrate had no scratch in the SW abrasion resistance test so as to be excellent in film hardness, and was good in sliding property on the surface since it measured 25°. Furthermore, this substrate generated neither scratch nor abnormal noise in the up-and-down movement test in the actual vehicle door.

Example 9

A procedure of Example 1 was repeated with the exception, in "Preparation of Sol Solution", that methyltriethoxysilane (MTES) and 3-glycidoxypropyltrimethoxysilane (GPTMS) were used as the trialkoxysilane and that the stirring was carried out at 35° C., thereby obtaining a heat ray shielding glass. As a result, the obtained substrate had no problem of appearance and was excellent in both heat ray shielding property and visible light transmittance. Further, this substrate was good in the SW abrasion resistance test since it was evaluated as having "slight scratch", and additionally good in sliding property on the surface since it measured 22°. Furthermore, this substrate generated neither scratch nor abnormal noise in the up-and-down movement test in the actual vehicle door.

Example 10

A procedure of Example 1 was repeated with the exception that dibutyltin diacetate (DBDA) was added in an amount of 0.5 wt % relative to the total solid content in "Preparation of Treating Agent", thereby obtaining a heat ray shielding glass. As a result, the obtained substrate had no problem of appearance and was excellent in both heat ray shielding property and visible light transmittance. Further, this substrate was good in the SW abrasion resistance test since it was evaluated as having "slight scratch", and additionally good in sliding property on the surface since it measured 23°. Furthermore, this substrate generated neither scratch nor abnormal noise in the up-and-down movement test in the actual vehicle door.

Example 11

A procedure of Example 1 was repeated with the exception that the stirring was carried out at 35° C. in "Preparation of Sol Solution", thereby obtaining a heat ray shielding glass. As a result, the obtained substrate had no problem of appearance and was excellent in both heat ray shielding property and visible light transmittance. Further, this substrate was good in the SW abrasion resistance test since it was evaluated as having "middling scratch", and additionally good in sliding property on the surface since it measured 27°. Furthermore, this substrate generated neither scratch nor abnormal noise in the up-and-down movement test in the actual vehicle door.

Comparative Example 1

A procedure of Example 1 was repeated with the exception that a ratio between the solid content made from the tetraalkoxysilane and the solid content made from the trialkoxysilane is 0:100 on a weight percentage basis or that the silica binder was formed only of the trialkoxysilane, thereby obtaining a heat ray shielding glass. As a result, the obtained substrate was insufficient in film hardness since the film was peeled off in the SW abrasion resistance test, and not good in sliding property on the surface since it measured 38°. Furthermore, this substrate generated abnormal noise in the upand-down movement test in the actual vehicle door, and additionally the film was peeled off after 20,000 repetitions of the up-and-down movement.

Comparative Example 2

A procedure of Example 1 was repeated with the exception that a ratio between the solid content made from the tetraalkoxysilane and the solid content made from the trialkoxysilane was set to be 50:50 on a weight percentage basis, thereby obtaining a heat ray shielding glass. As a result, the heat ray shielding glass was not good in sliding property on the surface since it measured 38° and additionally it generated abnormal noise in the up-and-down movement test in the actual vehicle door.

Comparative Example 3

A procedure of Example 1 was repeated with the exception that a ratio between the solid content made from the tetraalkoxysilane and the solid content made from the trialkoxysilane was set to be 100:0 on a weight percentage basis or that the silica binder was formed only of the tetraalkoxysilane, thereby obtaining a heat ray shielding glass. As a result, a precipitate was made in the treating agent. Further, cracks were made on the obtained heat ray shielding film.

Comparative Example 4

A procedure of Example 1 was repeated with the exception that a ratio between the solid content made from the tetraalkoxysilane and the solid content made from the trialkoxysilane was set to be 90:10 on a weight percentage basis, thereby obtaining a heat ray shielding glass. As a result, cracks were made on the obtained heat ray shielding film.

Comparative Example 5

A procedure of Example 1 was repeated with the exception that a ratio between the heat ray shielding component and the binder solid content was set to be 30:70 on a weight percentage basis, thereby obtaining a heat ray shielding glass. As a result, the film hardness was insufficient since "serious scratch" was observed in the SW abrasion resistance test and scratches were made in the up-and-down movement test in the actual vehicle door.

Comparative Example 6

A procedure of Example 1 was repeated with the exception that a ratio between the heat ray shielding component and the binder solid content was set to be 75:25 on a weight percentage basis, thereby obtaining a heat ray shielding glass. As a result, it was found that the film hardness was insufficient since "serious scratch" was observed in the SW abrasion resistance test and scratches were made in the up-and-down movement test in the actual vehicle door.

Comparative Example 7

A procedure of Example 1 was repeated with the exception that the heat treatment was carried out such that the substrate had a temperature of 300° C. in "Production of Heat Ray Shielding Glass", thereby obtaining a heat ray shielding glass. As a result, the heat ray shielding film was discolored yellow so as to be inferior in appearance. Further, $T_{1.4}$ and $T_{2.0}$ were high and therefore the heat ray shielding property was poor. Furthermore, sliding property on the surface was not good since it measured 45°, and additionally abnormal noise was generated in the up-and-down movement test in the actual vehicle door.

Comparative Example 8

A procedure of Example 1 was repeated with the exception that the heat treatment was carried out such that the substrate had a temperature of 80° C. in "Production of Heat Ray Shielding Glass", thereby obtaining a heat ray shielding glass. As a result, it was found that the film hardness was insufficient since the film was peeled off in both the SW abrasion resistance test and the up-and-down movement test in the actual vehicle door.

What is claimed is:

1. A heat ray shielding glass for vehicle, comprising a glass substrate and a heat ray shielding film formed on at least one surface of the glass substrate, the heat ray shielding film comprising:
    conductive oxide ultrafine particles dispersed in the film; and
    a silica binder for binding the ultrafine particles to each other, the silica binder including solid contents produced by hydrolysis and polycondensation of tetraalkoxysilane and trialkoxysilane,
    wherein a ratio between the solid content made from the tetraalkoxysilane and the solid content made from the trialkoxysilane is within a range of from 60:40 to 80:20 on a weight percentage basis, and a ratio between the conductive oxide ultrafine particles and the silica binder is within a range of from 35:65 to 70:30 on a weight percentage basis.

2. A heat ray shielding glass for vehicle, as claimed in claim 1, wherein the heat ray shielding film has a thickness ranging from 0.8 to 3 μm.

3. A process for producing a heat ray shielding glass for vehicle, as claimed in claim 1, comprising the steps of:
    (i) preparing a sol solution for forming the silica binder by the hydrolysis and the polycondensation of the tetraalkoxysilane and the trialkoxysilane;
    (ii) preparing a treating agent by mixing the conductive oxide ultrafine particles with the sol solution; and
    (iii) applying the treating agent to the glass substrate for vehicle and then performing a heat treatment on the glass substrate at a temperature ranging from 120 to 250° C.

* * * * *